United States Patent [19]
Michaels

[11] 3,948,399
[45] Apr. 6, 1976

[54] BALE POSITIONING DEVICE

[76] Inventor: Robert E. Michaels, Star Rte., Ten Sleep, Wyo. 82442

[22] Filed: Mar. 15, 1974

[21] Appl. No.: 451,550

[52] U.S. Cl. .............................. 214/1 Q; 198/7 BL
[51] Int. Cl.² ........................................... B65G 7/00
[58] Field of Search ............... 214/1 Q, 1 QB, 77 R; 198/7 BL, 9, 10

[56] References Cited
UNITED STATES PATENTS

| | | | |
|---|---|---|---|
| 2,235,913 | 3/1941 | Beane | 214/1 QB X |
| 2,634,003 | 4/1953 | Williamson et al. | 198/7 BL X |
| 2,792,136 | 5/1957 | Abbott | 198/7 BL |
| 2,855,086 | 10/1958 | Price | 198/7 BL |
| 3,409,147 | 11/1968 | McCracken | 214/1 QB |
| 3,472,398 | 10/1969 | Smith | 214/1 QB |
| 3,521,734 | 7/1970 | Kerber, Jr. | 198/9 |

*Primary Examiner*—Frank E. Werner
*Attorney, Agent, or Firm*—David H. Hill; Robert E. Harris

[57] ABSTRACT

A bale positioning device is disclosed for positioning bales in a manner such that pickup by an agricultural loading machine is facilitated. The positioning device is mounted near the intake bale chute of a conventional bale loading machine and includes a spider wheel that is adjustably mounted for free rotation on one end of an arm that has the other end adjustably connected with a bell crank mechanism such that said spider wheel is both lifted and rotated upon actuation of the bell crank mechanism. When the spider wheel is brought into contact with a bale that is not properly positioned, the wheel will cause the bale to be shifted about a vertical axis and/or a horizontal axis as the machine proceeds forwardly to thereby properly position the bale for entry into the intake chute of the pickup machine. Should the bale need to be rotated about a horizontal axis during positioning, the bell crank mechanism is actuated while the spider wheel is in contact with the bale to cause the spider wheel to be lifted and rotated to thereby provide the needed rotation to the bale during positioning of the same. The positioning device is also capable of repeatedly rotating the bale about a horizontal axis should such rotation be necessary or desirable such as, for example, to move a bale away from a ditch or fence line to facilitate pickup.

12 Claims, 10 Drawing Figures

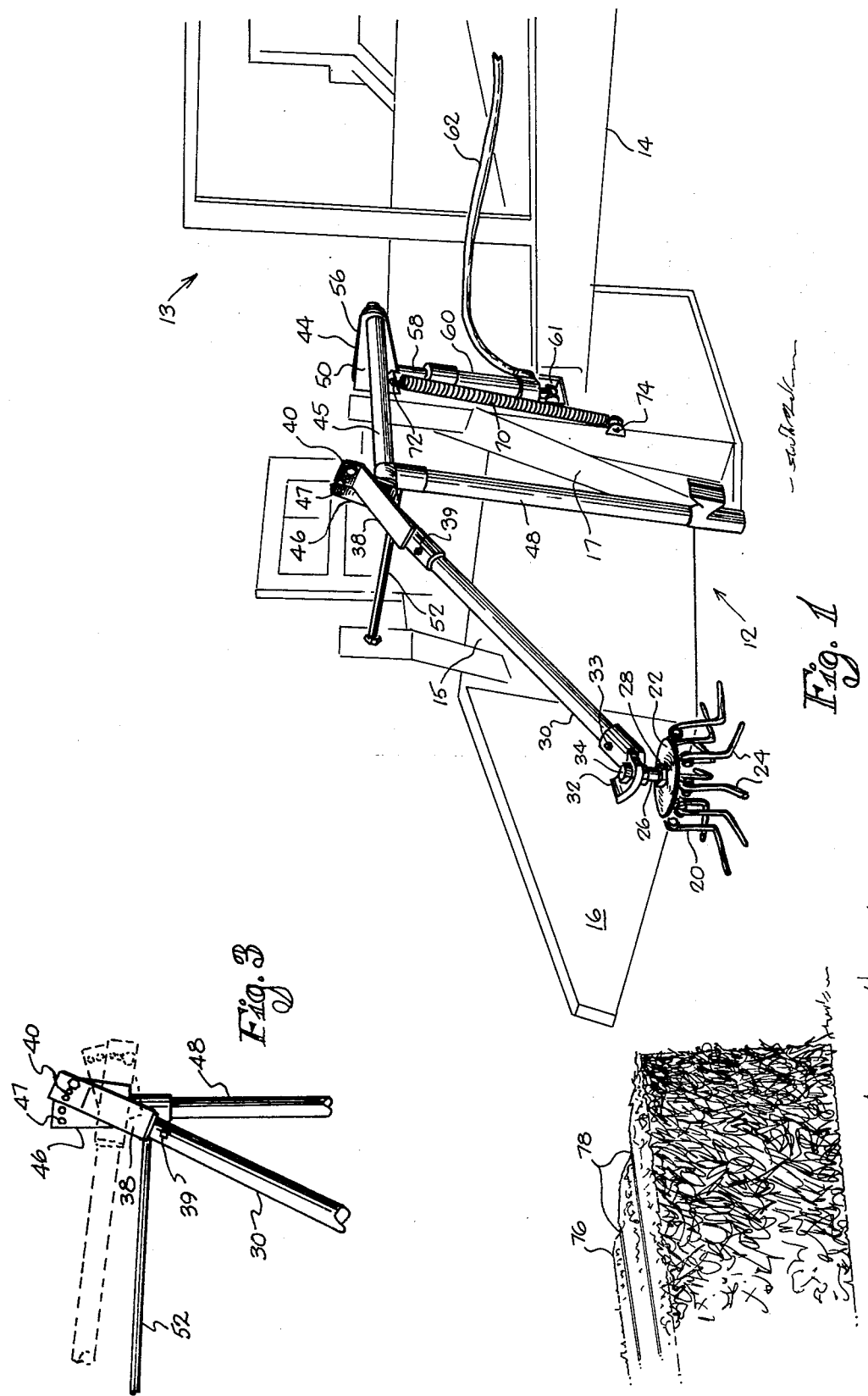

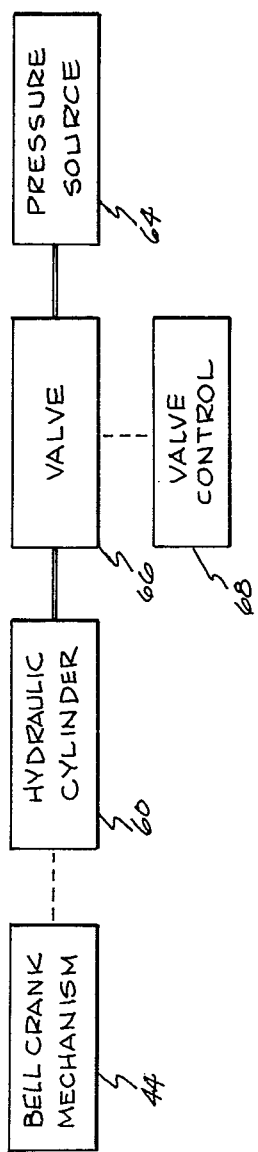
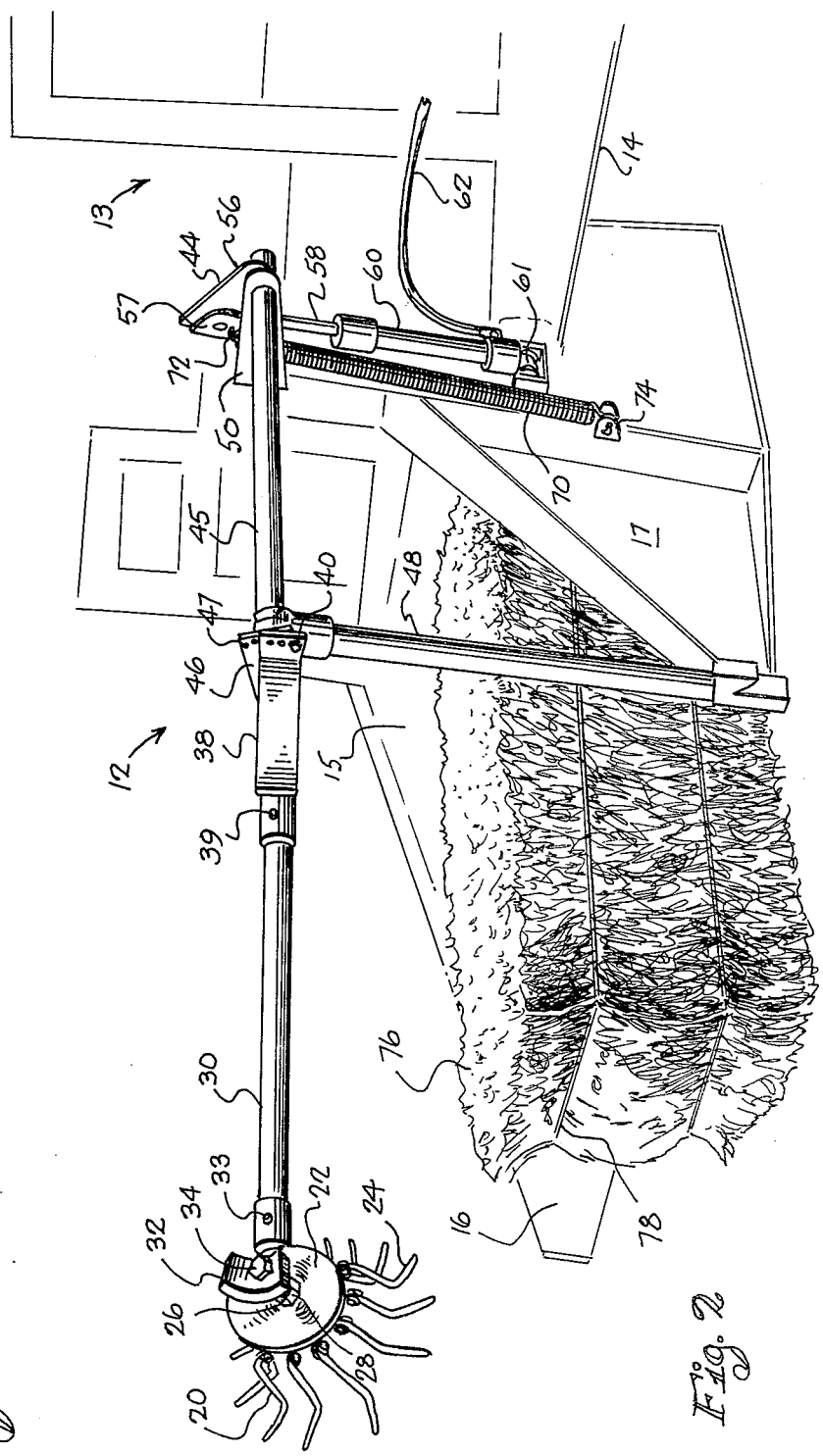

BALE POSITIONING DEVICE

FIELD OF THE INVENTION

This invention relates to a bale positioning device and more particularly relates to a device for use in conjunction with an agricultural bale loading machine to properly position the bale for machine pickup.

BACKGROUND OF THE INVENTION

Bale pickup, or loading, machines are well known and are utilized to pick up agricultural products that have been previously baled. As is well known, such bales of agricultural products are commonly formed by baling machines with the bales being bound by twine or wire encircling a bundle of plant stalks. Such bales are then normally discharged from the baling machine while in the field and some of the bales do not come to rest in positions convenient for later pickup by the bale loading machine. Such is the case, for example, where the bale is not aligned with the direction of travel of the baling machine or comes to rest with an undesired side in ground contact such as, for example, with the twine or wire contiguous to the ground when pickup requires the twine or wire to be wound horizontally about the bale and, thus, out of contact with the ground.

It has been found that, despite the use of care during the baling process, many discharged bales still come to rest in positions that preclude pickup due to such diverse factors as landing on corrugations, ditches, or large root clump normally found in fields, falling from the baler while the baler is making a turn, incorrect installation of the chute in the baling machine causing improper bale ejection, and/or unstable operation of the baling machine due to adverse field conditions.

While bales were loaded by hand there was, of course, no substantial problem with the positioning of the particular bales. However, bale loading machines now known or utilized normally require that the bales be presented to the loading machine with a particular orientation in order for the loading machine to properly load the bales. The required bale positioning for at least one well known loading machine is with the plant stalk in a vertical position with the twine or wire horizontally encircling the bale. Thus, where this type of positioning is required, bales that have the twine or wire contiguous to the ground must be rotated about a horizontal axis in order to bring the twine or wire into the required horizontal encircling position, while bales land crosswise or partially crosswire to the direction of loading machine travel must be turned about a vertical axis in order to position, or align, the bales for proper entry into the loading machine.

Heretofore, it has been necessary that the machine operator dismount from the machine, turn the bale, sometimes with the aid of a bale hook or the like, and then remount the machine before continuing the loading operation. This activity was obviously time consuming as well as being unsafe and inconvenient.

Bale loading machines have been suggested heretofore that incorporate a bale positioning, or orienting, device thereon. Such devices, however, have not proved to be satisfactory to meet all bale positioning requirements and, more particularly, have not proved to be satisfactory in positioning a bale where movement of the bale was required about a horizontal axis and/or about both horizontal and vertical axes. In addition, known bale positioning devices have not proved satisfactory for use where the bale moves a substantial distance such as by repeated rotation, to facilitate loading such as, for example, away from a ditch or fence line.

Examples of known bale loading machines incorporating bale positioning devices are to be found in U.S. Pat. Nos. 2,597,220 and 2,675,116.

SUMMARY OF THE INVENTION

This invention provides a positioning device that promotes convenience and operator safety as well as enhancing operational speeds, and is capable of rotating a bale about horizontal and/or vertical axes to achieve the desired bale positioning, the device being particularly useful in conjunction with a bale loading machine for properly orienting the bale for pickup by the bale loading machine.

It is therefore an object of this invention to provide an improved bale positioning device.

It is another object of this invention to provide an improved bale positioning device that is suitable for use in conjunction with a bale loading machine.

It is another object of this invention to provide an improved bale positioning device that is capable of shifting a bale about horizontal and/or vertical axes to achieve bale positioning.

It is yet another object of this invention to provide an improved bale loading device that is suitable for use in conjunction with a bale loading machine and is capable of rotating the bale about at least two axes in order to present the bale in proper position for pickup by the loading machine.

It is still another object of this invention to provide an improved bale loading device that is suitable for moving a bale a distance sufficient to remove the bale from obstructions preventing bale pickup.

It is yet another object of this invention to provide an improved bale positioning device that promotes convenience and operator safety as well as enhancing operational speeds.

With these and other objects in view which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of the bale positioning device of this invention shown in a lowered, or operative, position and attached to a bale loading machine;

FIG. 2 is a perspective view of the bale positioning device shown in FIG. 1 but shown in a raised, or inoperative, position and attached to a bale loading machine;

FIG. 3 is a partial front view of the bale positioning device shown in FIGS. 1 and 2 further illustrating relative positioning in the operative and inoperative positions;

FIG. 4 is a block diagram illustrating the bell crank mechanism control of the bale positioning device of this invention as shown in FIGS. 1 through 3;

DESCRIPTION OF THE INVENTION

Figure 5:
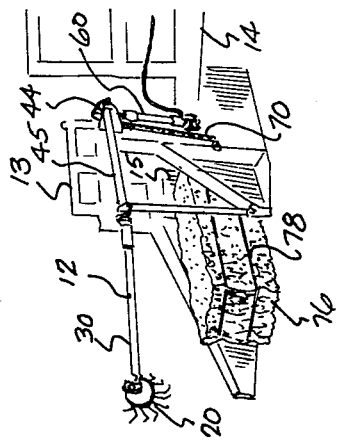
FIGS. 5 through 7 show the use of the bale positioning device of this invention in rotating a bale about a horizontal axis in order to position the same for loading.

Referring now to the drawings, the numeral 12 indicates generally the bale positioning device of this invention shown attached to a conventional bale loading machine 13. While the bale positioning device of this invention is not limited to use with a particular loading machine, it has been found particularly useful with a loading machine that requires that the bales be received with a predetermined orientation such as with the plant stalks in a vertical position bound by twine or wire encircling the bale horizontally with the bales being fed to the machine lengthwise. A machine with such requirements is, for example, a New Holland Stackcruiser.

As shown in the drawings, loading machine 13 conventionally includes a body portion, or frame, 14 having a forwardly opening intake bale chute 15 formed therein, said chute being preferably formed by space outwardly diverging side chute walls 16 and 17 between which the bales are received for pickup purposes as is well known in the art. While not shown, it is customary for such a loading machine to be controlled by an operator riding on the machine with the machine being propelled forwardly so that the intake chute is brought into contact with each bale to effect pickup.

As best shown in FIGS. 1 and 2, the bale positioning device of this invention is mounted on the body portion 14 of the loading machine 13 and, more particularly, is mounted on or near one of the chute walls.

Bale positioning device 12 includes a spider wheel 20 for bale contact. Spider wheel 20 has a hub 22 from the periphery of which extends a plurality of bale engageable L-shaped spring teeth 24. In addition, spider wheel 20 has a central shaft, or bolt, 26 secured to hub 22 by means of nut 28 with bolt 26 extending from spider wheel 20 in the direction opposite from that of spring teeth 24.

Spider wheel 20 is mounted to one end of tubular sleeve or arm 30 having adjustment pivot 32 thereon, said adjustement pivot having a slot therein for receiving bolt 26 therethrough and is attached to the end of sleeve 30 by means of a set screw 33. Spider wheel 20 is adjustably attached to adjustment pivot 32 by means of nuts 34 at opposite sides of the pivot. As shown in FIGS. 1 and 2, adjustment pivot 32 is arcuate so that the spider wheel can be angularly adjusted with respect to arm 30.

The end of arm 30 opposite to that of spider wheel 20 has an adjustable elbow 38 thereon (fastened to the sleeve by means of set screws 39) with the end of the elbow having a plurality of apertures 40 therein to permit adjustment of the angle and elevation of the arm 30. Arm 30 is preferably a tubular sleeve of light weight high strength tubing sufficient to provide adequate strength for positioning of the bales but yet being readily deformable in the event of a mishap, such as striking of an obstruction, for example, in order to save the remainder of the loading machine from damage.

Elbow 38 is connected with a bell crank mechanism 44 the shaft of which extends through tubular sleeve 45 and has a plate 46 with apertures 47 therein for connecting the bell crank mechanism with the elbow 38 to impart rotation thereto. Sleeve 45 provides the bearing and framework for the bale positioning device. Although not shown, a Zerk grease fitting may be utilized to prevent wear and lubricate the bell crank shaft extending through sleeve 45. Sleeve 45 is mounted to the loading machine and held in horizontal position at one end by means of a downwardly extending rod 48 the lower end of which is attached to the loading machine and more particularly to chute wall 17. The rear portion of sleeve 45 is mounted to the machine by means of ear 50 and the forward end of the sleeve is precluded from lateral movement by brace rod 52 extending at an angle from the front portion of the sleeve and attached at its opposite end to the loading machine chute.

Bell crank mechanism 44 includes a crank arm 56 one end of which is fixed to the shaft passing through the sleeve 45 while the other end of the arm 56 is conventionally connected (as by fastener 57) to one end of rod 58 of hydraulic cylinder 60 (the other end of which cylinder is attached to the loading machine chute by means of cylinder brackets 61) so that actuation of cylinder 60 causes the bell crank mechanism to rotate to thus rotate arm 30, and since arm 30 is connected on an angle with the bell crank mechanism, rotation of the bell crank mechanism will cause the arm 30 to be rotated and lifted to thus rotate and lift spider wheel 20.

Cylinder 60 is actuated through hose 62 which, as shown in FIG. 4, is connected to a conventional pressure source 64 through valve 66. As indicated in FIG. 4, valve 66 is controlled by valve control 68 which is preferably positioned near the operator on the loading machine so that the cylinder 60 can be actuated to effect movement of spider wheel 20 as desired. As shown, hydraulic cylinder 60 is actuated only to force piston rod 58 upwardly to rotate the bell crank mechanism in one direction. Hence, when the pressure is removed, as by opening valve 66, for example, the bell crank is causes to assume its original position under the influence of spring 70 connected between bell crank linkage arm 56 and the body portion of the loader as by spring shackle 72 at the bell crank and spring hangar 74 at the loading machine frame.

Figure 6:
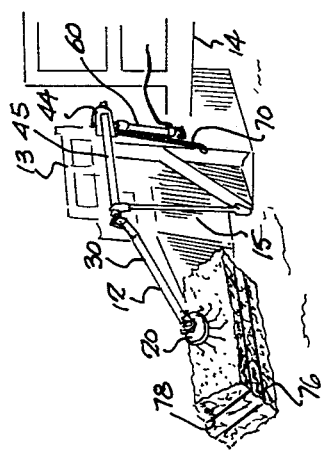
Figure 7:
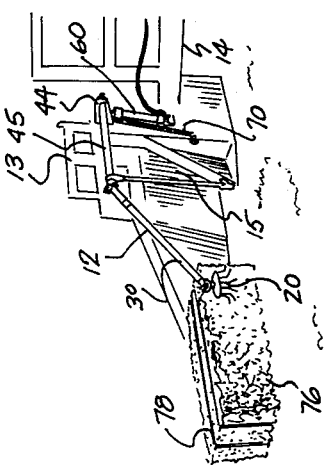

In operation, a bale 76 is positioned as needed so that the bale is received at the intake chute 15 of a loading machine 13 with the stalks vertical and the twine or wire 78 extending horizontally around the bale. The bale positioning device of this invention assures such positioning. As shown in FIGS. 5 through 7, if the bale is properly oriented lengthwise such that is need not be rotated about a vertical axis in order to be properly received by the loading device, then it is only necessary to rotate the bale about a horizontal axis if the twine or wire 78 should be contiguous to the ground (i.e., be encircling the bale vertically rather than horizontally, as is necessary). As shown in FIGS. 5 through 7, when this condition occurs, spider wheel 20 comes in contact with the side of the bale as loading machine 13 is moved forwardly toward the bale and, more particularly, so that the bale will be received at intake chute 15 of loading machine 13. The spring teeth 24 contact the bale and since the spider wheel 20 is rotatable, the wheel will turn and not damage the bale as the machine approaches the bale.

When the operator observes that the twine or wire 78 is vertical, he actuates cylinder 60 to rotate bell crank mechanism 24 which lifts the lower end of arm 30 and hence lifts and rotates spider wheel 20 with the teeth in contact with the bale. This causes the bale to be rolled or rotated about a horizontal axis to thus turn the bale by 90° so that the twine or wire is thereafter horizontal and the stalks are vertical (where this is the proper positioning for receipt of the bale 76 at intake 15 of loading machine 13).

As shown in FIG. 7, the spider wheel 20 and arm 30 continue their upward movement to the raised or inoperative position out of the way of the bale and the bale is then received at the intake bale chute 15 and is properly loaded. After the bale has been loaded, the operator releases the pressure supplied to cylinder 60 by opening valve 66 so that the spring bias of spring 70 will cause the bell crank to lower arm 30 and spider wheel 20 to the lower, or operative, position after which the device is ready to act upon the next bale.

If the bale should be crosswise or partially crosswire of the direction of travel of the loader, then it is necessary to move the bale by rotation about a vertical axis in order to straighten the bale so that it can be received in the proper lengthwise orientation where necessary for pickup. This will be achieved without necessity for actuation of cylinder 60 to rotate the bale about a horizontal axis if the bale is properly oriented with the stalks vertical and the twine or wire horizontally encircling the bale. In this case, the spider wheel 20 will contact the side of the bale and as the machine moves forwardly the bale will be turned about the vertical axis to straighten the same with the teeth passing in and out of the bale as the spider wheel rotates.

Figure 8:
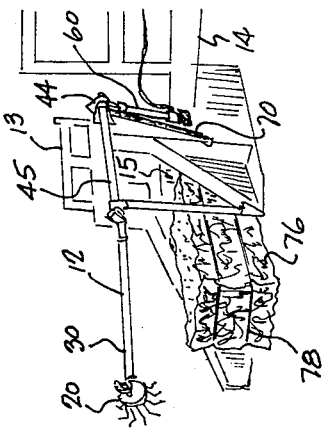
FIGS. 8 through 10 show the use of the bale positioning device of this invention to rotate a bale about both horizontal and vertical axes in achieving positioning of the bale for loading.
Figure 9:
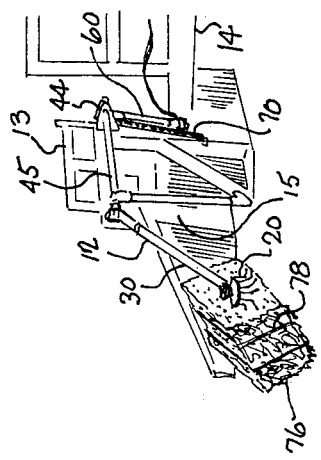
Figure 10:
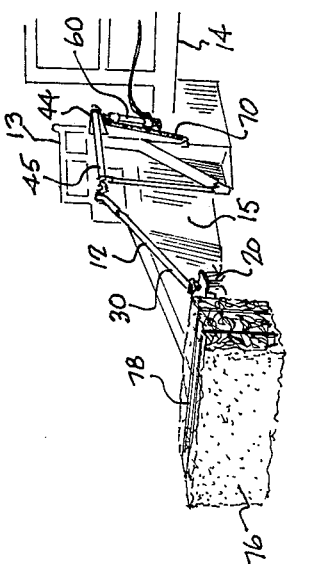

If, as shown in FIGS. 8 through 10, however, it is necessary to rotate the bale about both the horizontal and vertical axes in order to achieve proper positioning, this is accomplished by spider wheel 20 contacting the side of the bale to rotate the same as the machine moves forwardly with the bale being rotated about a vertical axis. The operator will also actuate cylinder 60 causing spider wheel 20 to be raised, which will also rotate the bale about a horizontal axis and thus position the bale about two axes, after which the spider and arm are again raised to the inoperative position as shown in FIG. 10, and the bale 76 is received at the intake 15 of the machine for loading purposes.

The bale positioning device of this invention was tested over an agricultural season and was found to operate at as high as 95% efficiency; that is, 95% of the incorrectly positioned bales approached by the loading machine were positioned properly on the first attempt with little or no appreciable slowing down of the loading process. This result was found to be much better than loading devices not utilizing this invention. By utilizing the device of this invention on a loading machine in a field where loading conditions were poor, that is, at least one out of 10 bales were incorrectly positioned, loading was found to be accomplished in a period of about 3 hours where it took approximately eight hours for like loading utilizing a loading machine without this invention incorporated thereon. The added time for loading a machine without the device of this invention was primarily due to the machine operator having to dismount from the loading machine, correctly positioning the bale, remounting the machine, and then again gaining machine momentum.

In view of the foregoing, it is felt that the device of this invention provides an improved loading device that is particularly well suited for positioning bales for bale loading machines.

What is claimed is:

1. A bale positioning device for a bale loading machine having a body portion that includes an intake bale chute adapted to receive bales for loading as said intake bale chute is moved toward said bales, said bale positioning device comprising:

support means mounted on said body portion of said bale loading machine and having a movable portion extending therefrom to a position adjacent to said intake bale chute;

contact means mounted on said movable portion of said support means, said contact means including a freely rotatable spider wheel having a plurality of spring teeth extending from the periphery thereof and being positioned to contact a bale having improper loading alignment at said intake bale chute prior to said bale being received at said intake bale chute; and control means connected with said support means to cause a bale in contact with said contact means to be moved to proper alignment prior to being received at said intake bale chute as said bale loading machine is moved toward said bale.

2. The bale positioning device of claim 1 wherein said movable portion of said support means includes an arm one end of which is connected to said contact means so that said contact means is rotated and moved upwardly due to movement of said movable portion of said support means.

3. The bale positioning device of claim 1 wherein said control means includes a bell crank mechanism connected with said support means to control movement of said movable portion thereof, and wherein said control means also includes a hydraulic cylinder connected to said bell crank mechanism to actuate the same.

4. The bale positioning device of claim 3 wherein said control means also includes a spring attached to said bell crank mechanism for urging said bell crank mechanism to a predetermined operative position unless actuated by said cylinder.

5. A bale positioning device for a bale loading machine having a body portion that includes an intake bale chute that opens forwardly from the front of said body portion and is adapted to receive bales for loading as said bale loading machine is moved in a forwardly direction toward said bales, said bale positioning device comprising:

a spider wheel having a plurality of spring teeth adapted to contact a bale to be positioned;

a movable support arm;

means attaching said spider wheel to one end of said support arm so that said spider wheel is freely rotatable with respect thereto but is otherwise constrained to movement therewith;

a bell crank mechanism;

means for supporting said bell crank mechanism on said body portion of said bale loading machine;

means for connecting said support arm to said bell crank mechanism;

a hydraulic cylinder connected to said bell crank mechanism to actuate the same; and means for controlling actuation of said hydraulic cylinder whereby actuation of said hydraulic cylinder causes said bell crank mechanism to move said support arm to thereby lift and rotate said spider wheel to effect rotation of a bale about a horizontal axis to position said bale while in contact with said spider wheel.

6. The bale positioning device of claim 5 in which said positioning device also includes a spring connected to said bell crank mechanism to urge the same to a predetermined operative position unless displaced by said hydraulic cylinder.

7. The bale positioning device of claim 5 wherein said support arm is connected to said bell crank mechanism through elbow means, and wherein said spider wheel is connected to said support arm by an adjustable pivot means thereby controlling the angular position of said spider wheel and the height to which said wheel is lifted upon actuation by said hydraulic cylinder.

8. The bale positioning device of claim 5 wherein said means for supporting said bell crank mechanism includes a horizontally positioned tubular sleeve, and wherein said bell crank mechanism has a rotatable portion received within said tubular sleeve.

9. A bale positioning device, comprising:
contact means engageable with a bale to be positioned wherein said contact means includes a spider wheel having bale engageable spring teeth thereon;
support means having a movable portion connected with said contact means to impart movement thereto wherein said movable portion of said support means includes an arm one end of which is connected with said spider wheel; and
control means connected with said movable portion of said support means to control the movement thereof in a predetermined path whereby said contact means causes a bale in contact therewith to assume a preselected position and wherein said control means includes a bell crank mechanism having a movable portion connected to the other end of said arm, said control means also including a hydraulic cylinder for actuating said bell crank mechanism whereby actuation of said bell crank mechanism causes said spider wheel to be lifted and rotated so that a bale in contact therewith is rotated about at least a horizontal axis.

10. The bale positioning device of claim 9 wherein said spider wheel is mounted on said one end of said arm so as to be freely rotatable with respect thereto, said positioning device causing a contacted bale to be moved about both vertical and horizontal axes should such movement be necessary to orient the contacted bale in said preselected position.

11. The bale positioning device of claim 9 wherein said hydraulic cylinder actuates said bell crank mechanism to move said arm from an operative lowered position to an inoperative raised position where said arm is retained until said hydraulic cylinder ceases to act thereon, and wherein said control means also includes a spring connected with said bell crank mechanism to move said arm from said inoperative raised position to said operative lowered position when said hydraulic cylinder is no longer acting upon said bell crank mechanism.

12. The bale positioning device of claim 5 wherein said movable portion of said support means includes an arm that is readily deformable upon contact with an obstruction.

* * * * *